United States Patent Office 3,699,056
Patented Oct. 17, 1972

3,699,056
METHOD OF HALOGENATING CRYSTALLINE ALUMINOSILICATE
Shinji Takase and Tomonori Shiori, Kawasaki, Japan, assignors to Nippon Oil Company Limited, Tokyo, Japan
Filed Mar. 5, 1970, Ser. No. 16,880
Claims priority, application Japan, Mar. 5, 1969, 44/16,212
Int. Cl. B01j *11/78, 11/40*
U.S. Cl. 252—442             1 Claim

ABSTRACT OF THE DISCLOSURE

Method of halogenating crystalline aluminosilicate which comprises bringing a halogenated hydrocarbon wherein the halogen is at least one member selected from the group consisting of fluorine and chlorine into contact with the crystalline aluminosilicate having openings of 6–15 A. with or without active metal components supported thereon in a flow method at a ratio of 1–1000 cm.$^3$ (stp.) of the halogenated hydrocarbon per gram of the crystalline aluminosilicate per minute in the presence of a non-reducing gas at a temperature of 160–350° C. to a halogen content of 0.01–20% by weight.

Figure 1:
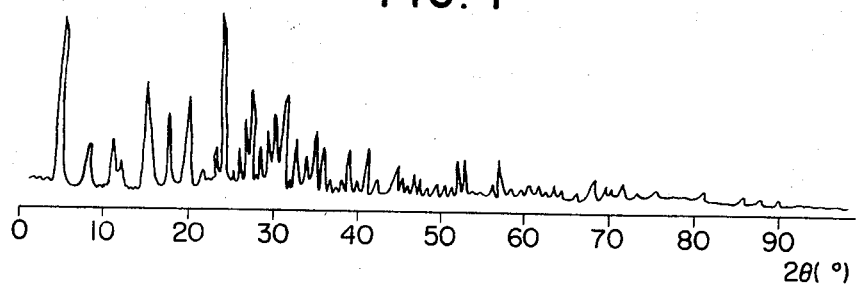

BACKGROUND OF THE INVENTION (1) Field of the invention

This invention relates to a novel method of halogenating aluminosilicate in order to introduce halogens thereinto.

More particularly, it is concerned with a method of halogenating crystalline aluminosilicate to a halogen content of 0.01–20% by weight by bringing a halogenated hydrocarbon into contact with aluminosilicate having openings of 6–15 A. with or without active metal components supported in a flow method at a predetermined rate in the presence of a non-reducing gas at a temperature of 160° C.–350° C.

(2) Description of the prior art

It is known to incorporate halogens into alumina such as $\gamma$-, $\eta$-, $\theta$- or $\alpha$-alumina and to use the resulting halogenated alumina as a carrier for catalysts. The catalysts supported on the alumina having a halogen introduced are widely used in hydrocarbon conversion reactions as they are effective, for instance, in improving the catalytic activity and prolonging the catalytic life. For example, introduction of halogens into alumina with platinum supported as the active metal component has been described in Japanese patent publication No. 2069/1954. In the prior art the halogen is introduced by subliming a metal halogenide such as aluminum chloride to adhere it upon the surface of alumina, by the use of a gaseous inorganic halogenide such as boron trifluoride or hydrogen fluoride, by simultaneously introducing platinum and chlorine by the use of chloroplatinic acid to an appropriate content of chlorine, or by contacting a halomethane such as carbon tetrachloride together with a non-reducing gas with alumina to combine or adsorb the elementary halogen by the reaction between the surface of alumina and the halomethane.

Of these methods, the method by the use of a halomethane is considered to be technically and practically superior. However, it is required in this method to employ alumina with a very large surface area or to elevate the contact temperature to a considerable degree in order to introduce a substantial amount of halogen, for example, by the use of carbon tetrachloride. On the other hand, at elevated temperatures, the chlorine once introduced will disappear due to formation of aluminum chloride or other volatile chlorides. It is therefore considerably difficult to afford a chlorine content, for example, over 10% by weight by the use of this procedure.

As described above, there are few methods of introducing elementary halogens into silica alumina with success despite a number of investigations made. This is because it is difficult to introduce a desired amount of the halogen into the silica alumina with a sufficient content of silica for the use as carrier owing to reactivity of the halogenating agent only with the alumina component but not with the silica component. Accordingly, the contact method of a halomethane such as carbon tetrachloride is not satisfactory for effectively introducing the halogen into silica alumina.

On the other hand, attention has been recently directed to crystalline aluminosilicate containing as the base a skeleton in which the SiO$_4$ and AlO$_4$ tetrahedrones are regularly arranged at an atomic ratio O/(Si+Al)=2 and having a structure in which the negative charge formed by the skeletal structure is saturated with the cation. The crystalline aluminosilicate finds wide various applications in drying of gases and liquids, selective separation of gaseous mixtures, separation of hydrocarbon mixtures, as the carrier for catalysts, catalyst, ion exchanger and the like.

Although the aluminosilicate as it is exerts considerably good effects when used for the above-mentioned applications, it is desired to introduce a halogen therein in such a way as heretofore investigated with alumina to achieve an improvement in its characteristics.

However, the introduction of halogens, which have achieved somewhat success in the case of alumina as described above, does not produce the desired effects with silica alumina because it is entirely different in the physical properties and structure of alumina due to the silica component contained. This may apply to crystalline aluminosilicate, which has quite peculiar structure and physical properties, and it is considered more difficult to introduce halogens thereinto. It is considered especially difficult to introduce halogens not only in physical adsorption of the halogenide but also in chemical bonding between the halogen atom and an atom constituting aluminosilicate without causing destruction of the inherent characteristic structure.

Investigations have been made of the state of adsorption of various halogenides upon a certain aluminosilicate. For example, description is made of adsorption on chabazite by R. M. Barrer in Transaction Faraday Soc. 49, 940–948 (1953). There is described by Barrer adsorption of halogens on chabazite to a certain degree by chemical reaction on allowing to stand for a long period of time a special halogenide (CHF₂Cl) adsorbed at 25° C. or 150° C. However, he reports on pages 943–944 destruction of the crystals of chabazite and formation of amorphous portion.

Alternatively, a method of treating crystalline aluminosilicate with a metal such as platinum supported with a metal fluoride such as AlF has been recently disclosed in U.S. Pat. No. 3,413,370.

SUMMARY OF THE INVENTION

This invention is directed to a novel halogenating method of crystalline aluminosilicate distinguished from these prior arts.

It is an object of this invention to provide a method of introducing a substantial amount of halogens into crystalline aluminosilicate having openings of 6–15 A. with or without active metal components supported thereon without destruction of the inherent structure and not merely in adsorption. Other objects will appear hereinafter.

We have made the surprising discovery that halogens are introduced by passing a variety of halogenated hydrocarbons including $CHCl_3$, $CCl_2F_2$ and $CHF_2Cl$ at a predetermined rate in contact with crystalline aluminosilicate having openings of 6–15 A. in the presence of a non-reducing gas at a temperature of 160–350° C. and further that the halogen is introduced not merely in adsorption as considered on the basis of analysis of the halogen and the inherent structure of the aluminosilicate is not destructed as confirmed on the basis of analysis by X-ray diffraction.

This invention relates to a method of halogenating crystalline aluminosilicate which comprises bringing a halogenated hydrocarbon wherein the halogen is fluorine and/or chlorine into contact with crystalline aluminosilicate having openings of 6–15 A. with or without active metal components supported in a flow method at a ratio of 1–1000 cm.³ stp. of the halogenated hydrocarbon per gram of the aluminosilicate per minute in the presence of a non-reducing gas at a temperature of 160–350° C.

As the crystalline aluminosilicate are used those with the same basic structure as of natural Foujosite, Moddenite with large openings and the like. They include synthetic zeolites such as X-type and Y-type zeolite available on the market. The openings should be in the range between 6 A. and 15 A. in order to subject the halogenating agent, namely, the halogenated hydrocarbon to effective contact with the surface area inside the small openings for the halogenation.

The crystalline aluminosilicate usually contains equimolar $Al_2O_3$ and $Na_2O$ and may be used as it is. However, if higher activities are desired, the sodium ion is preferably exchanged with a metal ion with a valency of two or more, or with ammonium ion followed by heating and calcining treatment to convert to the H or decationized type. As the metals with a valency of two or more mentioned Mg, Ca, Sr, Ba, Zn, Cd, Mn, Ni, Co, rare earth metals and the like are used. The exchange ration is preferably 50% or higher and more preferably 80% or higher.

In the method of this invention crystalline aluminosilicate with one, two or more of metals of the Groups IV, V, VI, VII and VIII supported as the active metal component may be also employed. The amount of metals supported is 0.01–10% by weight, preferably 0.05–5% by weight of the crystalline aluminosilicate. This invention is characterized by feasibility of introducing the halogen into the aluminosilicate with these active metal components with similar effectiveness.

The halogenated hydrocarbons used in this invention are hydrocarbon compounds in which one, two or more of the hydrogen atoms are substituted with chlorine and/or fluorine, representative of which are $CH_2Cl_2$, $CHCl_3$, $CCl_4$, a series of compounds known under the trade name Freon such as $CF_4$, $CHF_3$, $CH_2F_2$, $CHClF_2$, $CClF_3$, $CCl_2F_2$, $CClF_2-CClF_2$ and $C_6H_5F$ and the like.

In the method of this invention, the characteristic feature lies in passing the aforementioned halogenated hydrocarbons through the aforementioned aluminosilicate filled in a flow type vessel at a ratio of 1–1000 cm.³ (stp.) per gram of the crystalline aluminosilicate per minute in the presence of a non-reducing gas such as, for example, nitrogen, air, oxygen, methane, ethane, helium or the like at a temperature of 160–350° C.

At temperatures below 160° C. the halogenation is not effectively achieved, whereas at temperatures over 350° C. the structure of crystalline aluminosilicate will be destructed and further the halogenide once introduced will be eliminated in the form of volatile compounds. The presence of a non-reducing gas is effective in smoothly conducting the halogenation and preventing local halogenation or formation of undesired products such as HCl and HF. When the non-reducing gas is absent effective halogenation will not be feasible. Usually, the non-reducing gas is passed in admixture with the halogenated hydrocarbon over the crystalline aluminosilicate. It is preferred to employ the non-reducing gas at a concentration of 1/1000–1000 times the volume of halogenated hydrocarbon.

The halogenated hydrocarbon is supplied at a ratio of 1–1000 cm.³(stp.)/g. of the crystalline aluminosilicate/ min. In other words, the halogenated hydrocarbon in an amount of 1–1000 cm.³(stp.) (volume as calculated in terms of the gas volume in the standard state) per minute per one gram of the crystalline aluminosilicate is required to be supplied. With the amount less than 1 cm.³/cm.³/ min. is not achieved a substantial amount of the halogenation. When the amount is more than 1000 cm.³/cm.³/min., the amount of halogenated hydrocarbon exhausted without participating in the halogenation will be increased with no use, the halogen atom once introduced will be eliminated in the form of volatile substances, and in some cases the structure of crystalline aluminosilicate will be destructed hardly achieving effective halogenation. The halogenated hydrocarbon is normally supplied in gaseous state. If a halogenated hydrocarbon hardly transformed into gas is employed, it may be supplied in association with the above-stated non-reducing gas.

According to the method of this invention it is preferable to dry the crystalline aluminosilicate in advance under nitrogen or air at 350° C.–550° C. for 3–6 hours followed by lowering of the temperature to a predetermined degree prior to the halogenating treatment. Especially in the case of crystalline aluminosilicate supporting active metal component pre-treatment with hydrogen is preferred.

The time of supplying the halogenated hydrocarbon in the halogenating method of this invention is not particularly restricted, but is preferably from several minutes to one hour. The higher the rate of supplying the halogenated hydrocarbon or the longer the time of supplying the same the more will be the amount of halogen introduced. The content of halogen is required to be 0.01–20% by weight. Contents more than 20% by weight will result in destruction of the inherent structure of crystalline aluminosilicate.

In the present invention pressure under which the halogenation is carried out is not restricted. Elevated or reduced pressure may be employed, but normal pressure is preferably used in view of easiness in procedure.

The crystalline aluminosilicate halogenated in accordance with the method of this invention is useful as valuable catalyst or in the use of crystalline aluminosilicate with which higher acidic activities are desired.

DESCRIPTION OF PREFERRED EMBODIMENTS

The invention will be described in greater detail in conjunction with the following specific examples.

Example 1

Fifty grams of molecular sieve in Na-Y type available on the market were ion-exchanged in an aqueous solution of Ca(NO₃)₂ to exchange 86% of the Na, washed with water and then placed in a solution containing $[Pt(NH_3)_4]^{++}$ to introduce 0.5% by weight of platinum. After molded the resulting mass was dried at 120° C. and calcined at 500° C. Ten grams of the product were thoroughly dried by predetermined procedures. The results are shown in Table 1. Analysis of the halogens was made by the same methods as in Example 1.

The results indicate excellency of the halogenating method according to the present invention. X-ray diffraction analysis also showed no destruction of the structure of crystalline aluminosilicate.

TABLE 1

| Example | Class of crystalline aluminosilicate | Halogenated hydrocarbon | Non-reducing gas | Halogenation temperature, °C. | Halogenation time, min. | Halogen contents, wt. percent |
| --- | --- | --- | --- | --- | --- | --- |
| 3 | Na-X type, 80% of Na ion-exchanged with Zn | CHClF₂, 50 cm.³/min. | Air, 200 cm.³/min. | 180 | 27 | Cl: 0.66; F: 0.44 |
| 4 | Na-Y type, on the market, 80% of Na ion-exchanged with Mg, carrying 1 wt. percent Ni and 5 wt. percent W. | CHF₃, 50 cm.³/min. | Nitrogen, 250 cm.³/min. | 210 | 10 | F: 0.75 |
| 5 | Na-Y type, ion-exchanged with NH₄⁺ followed by heat treatment to the H-Y type, carrying 0.3 wt. percent Pt. | Nitrogen gas at 100 cm.³/min. bubbled through C₆H₅F at room temperature | | 200 | 10 | F: 0.24 |
| 6 | Na-Y type, ion-exchanged by 70% with Cd, carrying 0.4 wt. percent Pt. | Nitrogen gas at 300 cm.³/min. passed through CCl₄ temperature | | 220 | 40 | Cl: 12 |
| 7 | Ca-Y type, carrying 0.5 wt. percent Co and 0.5 wt. percent Mo. | Nitrogen gas at 250 cm.³/min. bubbled through CHCl₃ at 0° C. | | 200 | 10 | Cl: 4.60 |
| 8 | Na-X, 70% ion-exchanged with Ce | Air at 200 cm.³/min. bubbled through CH₂Cl₂ at 0° C. | | 230 | 20 | Cl: 3.18 | and reduced under hydrogen at 500° C., and thereafter, while maintaining the temperature at 210° C. CCl₂F₂ at a flow rate of 50 cm.³/min. was passed for 15 min. together with nitrogen gas at a flow rate of 150 cm.³/min. After supply of the halogenide was stopped nitrogen gas was continued to supply for sufficient purge.

The halogenated crystalline aluminosilicate thus obtained was assayed by potentiometric titration, and for fluorine content by the method according to UOP M290–55–1 to find a chlorine content of 0.21% by weight and a fluorine content of 0.16% by weight. In the potentiometric titration, a specimen is decomposed in 7 N H₂SO₄ and allowed to cool to transform the chlorine into Cl⁻ ion, and then titrated with 0.1 N AgNO₃ using a silver-silver nitrate electrode as the indicator electrode and a caramel electrode as the relative electrode, the point at which ΔE/ΔV AgNO₃ is large being taken as the end point. In the method of UOP M290–55–1, a specimen is added to 60% H₂SO₄ followed by addition of Ag₂SO₄, the mixture steam-distilled at about 140° C. for 90 min., and the distillate containing H₂SiF₆ titrated with 0.001 N aqueous solution of Th(NO₃)₄ using 0.1% aqueous solution of alizarine S as the indicator for fluorine assay.

Figure 2:
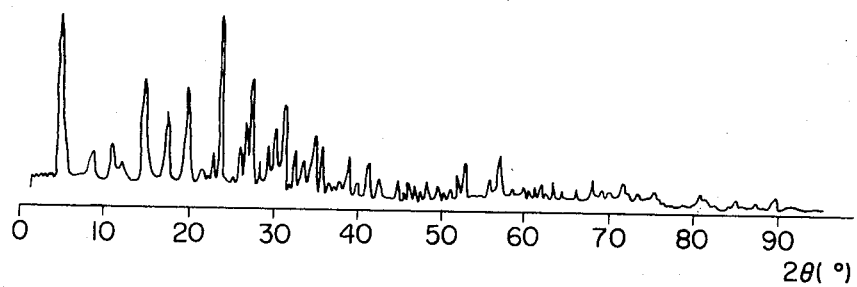

Examination was made by X-ray diffraction as to whether the structure of crystalline aluminosilicate was destructed. FIG. 1 is the X-ray refraction pattern of crystalline aluminosilicate Ca-Y-Pt prior to the halogenation and FIG. 2 is the X-ray diffraction pattern of the same following the halogenation. The result indicates that the halogenation does not lead to destruction of the crystals of aluminosilicate with the original crystal form maintained. As obviously understood from the method of halogen analysis employed the introduced halogen does not represent the halogenide merely adsorbed.

Example 2

Ten grams of molecular sieve of Ca-X type with openings 9 A. in average diameter available on the market was calcined at 500° C. and, while maintaining the temperature at 200° C., contacted for 30 min. with CClF₂-CClF₂ introduced at a flow rate of 100 cm.³/min. and nitrogen introduced at a flow rate of 200 cm.³/min. The product, after supply of the halogenide was stopped, was thoroughly purged with nitrogen.

Analysis of the halogens were made by the same methods as in Example 1 to find a chlorine content of 0.14% by weight and a fluorine content of 0.11% by weight.

Analysis by means of X-ray diffraction also revealed no destruction of the structure of crystalline aluminosilicate.

Examples 3–8

A variety of crystalline aluminosilicate, each weighing 10 g., was thoroughly dried or calcined and halogenated Referential Example 1

On the molecular sieve of Ca-Y type in Example 1 was thoroughly adsorbed CHClF₂ at a temperature of 150° C. under a pressure of 200 mm. Hg and the product was allowed to stand for 24 hours. Evolution of a small amount of CO and CO₂ was observed. It was then heated for degassing and analyzed for crystal structure by means of X-ray diffraction to find destruction of the structure.

Referential Example 2

Ten grams of the Ca-Y-Pt with an exchange ratio of 80% and carrying 0.5 wt. percent platinum were air dried and, while maintaining the temperature at 380° C., nitrogen gas bubbled through CCl₄ at 25° C. was passed at a rate of 500 cm.³/min. for 1 hour.

Figure 3:
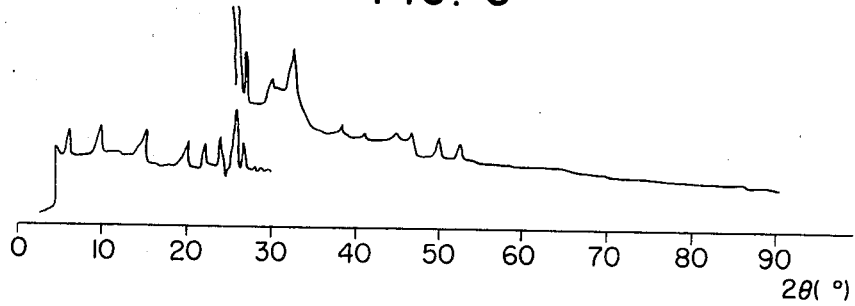

About 23 wt. percent chlorine was introduced, but was shown in FIG. 3, the structure of crystalline aluminosilicate was destructed to be nearly amorphous.

Referential Example 3

Ten grams of the same crystalline aluminosilicate Ca-Y-Pt as in Example 1 were dried and reduced under hydrogen at 500° C. for 3 hours and thereafter, while maintaining the temperature at 140° C., CClF₂-CClF₂ and nitrogen gas were passed for 30 min. respectively at flow rates of 10 cm.³/min. and 100 cm.³/min. There occurred no substantial halogenation.

We claim:
1. Method of halogenating crystalline aluminosilicate which comprises bringing a halogenated hydrocarbon containing from 1 to 6 carbon atoms wherein the halogen is at least one member selected from the group consisting of fluorine and chlorine into contact with the crystalline aluminosilicate having openings of 6–15 A. with or without active metal components supported thereon in a flow method at a ratio of 1–1000 cm.³(stp.) of the halogenated hydrocarbon per gram of the crystalline aluminosilicate per minute in the presence of a non-reducing gas at a temperature of 160–350° C. to a halogen content of 0.01–20% by weight.

References Cited

UNITED STATES PATENTS

| 3,354,078 | 11/1967 | Miale et al. | 252—455 X |
| 3,403,108 | 9/1968 | Leftin et al. | 252—455 X |
| 3,419,503 | 12/1968 | Giannetti et al. | 260—683.68 X |
| 3,551,516 | 12/1970 | Ashley et al. | 252—442 |
| 3,409,682 | 11/1968 | Mitsche | 260—683.68 X |

CARL F. DEES, Primary Examiner

U.S. Cl. X.R.

252—455 Z